Patented Dec. 8, 1942

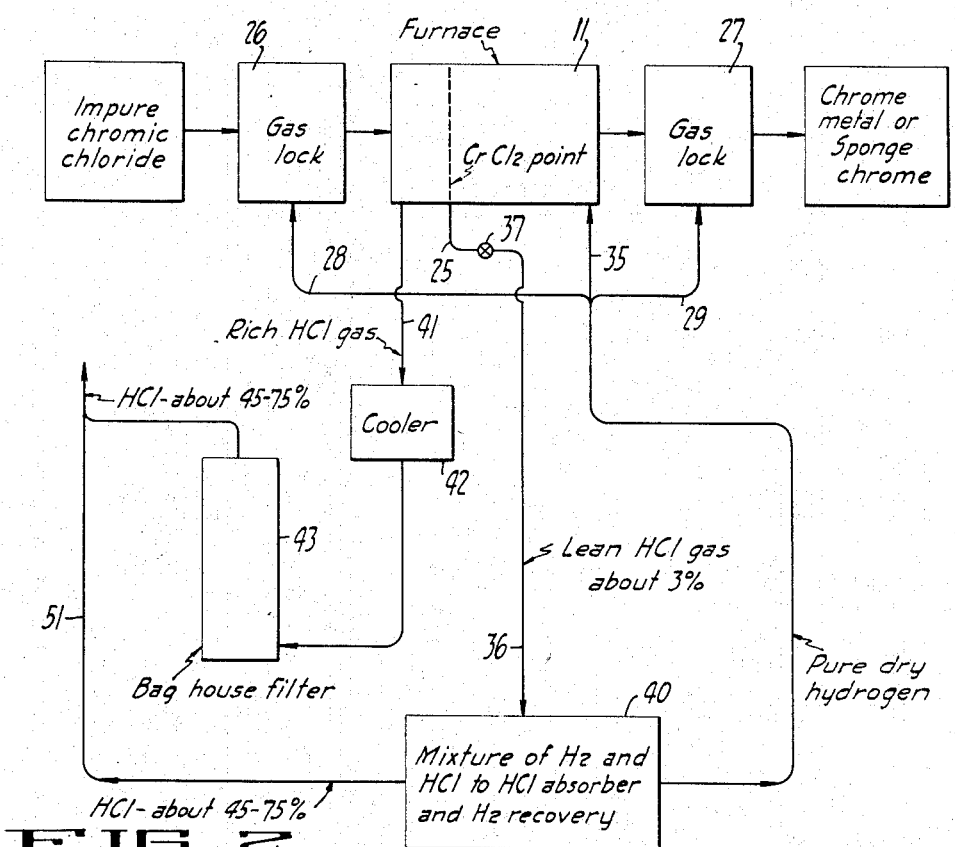

2,304,463

UNITED STATES PATENT OFFICE 2,304,463

PROCESS FOR TREATING AND REDUCING CHROMIUM CHLORIDE

Charles G. Maier, Oakland, Calif., assignor to The Dow Chemical Company, Midland, Mich., a corporation of Michigan Application April 27, 1940, Serial No. 332,421

7 Claims. (Cl. 23—56)

This invention relates to a process for the treatment of violet chromium trichloride to the end that certain metal chlorides contaminating the chromic chloride can be minimized or eliminated, and the chromic chloride rendered permanently non-hygroscopic.

A process of the present invention also relates to an improved process for reducing chromium chloride by hydrogen to chrome metal at temperatures near 800° C. generally according to the disclosure of my Patent 2,142,694 issued January 3, 1939.

In the aforementioned patent the difficulties attendant upon the hygroscopic nature of chromium chloride and the desirability of special drying of the source material fed to the reduction unit was described as follows:

"In practicing my invention, it is desirable to remove all traces of moisture which may be contained on or in the chromium chloride. The so-called violet anhydrous crystals of $CrCl_3$, which are virtually insoluble in water, nevertheless are capable of adsorbing several percent water when they have previously contacted this medium as liquid, or been stored in air of normal humidity. I have found it desirable, therefore, to dry the crystals by heating them, preferably to 200°–300° C. and preferably in a vacuum, before introducing them into the reduction furnace, and to carry out the transfer quickly, or in a dried atmosphere, so that recontamination is avoided. Temperatures higher than this must not be used not only because the chloride vaporizes and dissociates, but also because the crystals become reactive with oxygen at temperatures slightly above 300° C."

At this point it is essential to emphasize the reference herein and limitation to the material referred to as violet chromic chloride, the so-called insoluble form of $CrCl_3$, in contrast to the hydrated green crystals which constitute the only form of chromic chloride heretofore readily available commercially. The green hydrated crystals, $CrCl_3 \cdot 6H_2O$, cannot be dehydrated and thus converted to the insoluble violet form by any direct method known at present or described in the literature.

The drying of violet chromic chloride according to the disclosure of my patent, as quoted above, proved to be a nuisance in practice. The hygroscopic nature of the product tended to vary from sample to sample, and further, it was necessary to store the dry material in a moisture free environment since the crystals remained hygroscopic after drying. A study of the hygroscopic nature of $CrCl_3$, and means of overcoming it, resulted in the following discoveries:

1. Extremely pure $CrCl_3$ is insoluble in water, dilute acids and alkalies, and nearly all organic solvents, and is non-hygroscopic.

2. Chromic chloride containing small quantities of impurities is slowly soluble in water and may be readily dissolved in the presence of reducing agents such as iron, zinc, etc. Depending on the kind and amount of impurities, it is moderately to strongly hygroscopic.

3. Among the impurities responsible for solubility and hygroscopic character of $CrCl_3$ produced from chrome ores, two classes are distinguishable. The first is provided by chromous chloride, and the second by the chlorides of aluminum, magnesium, iron, and, sometimes, manganese and nickel. Silicon chlorides, which might be expected, have not been disclosed by careful search. These materials are set forth in the order of decreasing effect, the chromous chloride being most potent. It is distinguished from the other metal chlorides by separate classification because its action is partly chemical and because there is a considerable mutual solubility of anhydrous chromous and chromic chlorides in the liquid state, which is not true of the other chlorides mentioned.

Ordinary methods of drying the violet form of $CrCl_3$ fail to render satisfactorily the material permanently non-hygroscopic and, in fact, even enhance the property if exact control is not maintained. Thus, drying in a vacuum or inert gas tends to dissociate $CrCl_3$ forming more $CrCl_2$ and making the product even more hygroscopic, particularly when temperatures above about 300° C. are used. The actual drying below this temperature, as specified in my patent, is slow, tedious, and if too many impurities are present, ineffective. Similarly, oxygen-containing gases cannot be used and if only chlorine is added to an inert gas for drying, or to prevent dissociation and chromous chloride formation, the volatility as chromium tetrachloride is enhanced.

The discovery of the present invention, which has enabled these disadvantages to be overcome, can be briefly set forth as comprising the finding that when hygroscopic $CrCl_3$ is heated to a temperature of from 300° C. to a limiting upper temperature below that at which volatilization of chromic chloride is objectionably appreciable, usually about 700° C., in a dry, non-oxidizing atmosphere containing sufficient pure, dry hydrogen chloride, moisture and some of the contaminating chlorides can be separated from the solid chromic chloride. The temperature can exceed 600° C. By operating at 600° C. the iron content can be reduced to a few tenths of a per cent. By operating at 700° C. it can be rendered negligibly small. The limiting upper temperature is that at which chromic chloride volatilization becomes appreciable.

When a small chlorine content is present in the hydrogen chloride, the chromium trichloride is rendered insoluble in water and formation of $CrCl_2$ is minimized or prevented. Residual impurities which have not been volatilized as $MgCl_2$ may thereafter be leached from the $CrCl_3$ by water without the chromic chloride going into solution in contrast to what would take place if the leaching were attempted upon the material before treatment with the hydrogen chloride.

There is evidence that this hydrogen chloride treatment affects the structure of the crystals. The color after the treatment is less violet and more of the rose or puce color is present.

The generic process is applicable to the production of a purified non-hygroscopic form of $CrCl_3$ as well as to the production of metallic chromium. These processes will be taken up in order and present preferred operations disclosed for production of each material.

In the drawing, accompanying and forming a part hereof, Figure 1 is a flow sheet presenting certain steps in the process for production of the purified, non-hygroscopic form of chromium chloride, while Figure 2 is a flow sheet representative of certain steps in the process practiced for production of metallic chromium.

$CrCl_3$ production

In producing non-hygroscopic chromium trichloride as such, I heat the impure and hygroscopic crystals of violet $CrCl_3$ in an atmosphere of anhydrous hydrogen chloride to a temperature of between 300° C. to 700° C. By such treatment the major portion of the aluminum chloride, and all of the iron chlorides are volatilized. If a stream of hydrogen chloride be passed over the mass undergoing treatment, moisture and volatilized chlorides are removed. The separated volatilized chlorides, as ferric chloride, can be recovered. This leaves as the chief impurities the chlorides of magnesium and some small quantity of chromous chloride in the di-valent condition.

In case a stream of hydrogen chloride is not passed over the violet $CrCl_3$ mass undergoing treatment, and the mass is merely heated in a hydrogen chloride atmosphere, volatile chlorides as ferric chloride, not condensing on the apparatus when it cools, will be present in the mass. These will be removed upon the subsequent water leaching.

The atmosphere can include an inert diluent such as carbon dioxide or nitrogen. However, the presence of a diluent is somewhat disadvantageous as it decreases effectiveness of the hydrogen chloride. In any case, the hydrogen chloride content should be large enough to ensure freeing the contaminating metal chlorides.

After treatment and cooling to atmospheric temperature, the rose colored product is leached with water and the water soluble chlorides as magnesium chloride and $CrCl_2$ are removed.

If it is desired to prevent the presence of $CrCl_2$ in the leach liquor, such as may be the case if the $MgCl_2$ is recovered for other purposes, I may add a small percentage of chlorine gas to the hydrogen chloride gas, usually about 5%, and not over 10% of chlorine sufficing. This does not change the action of the hydrogen chloride in forming rose colored crystals, but minimizes the $CrCl_2$ present to a negligible quantity.

After leaching, the product can be dried in any convenient manner at temperatures not in excess of 300° C. The product thus obtained is exceptionally pure and non-hygroscopic but may contain small amounts of $Cr_2O_3$.

In order to obtain material of highest purity I have further found it advisable to introduce into the atmosphere containing substantially only hydrogen chloride, and up to 10% chlorine, a small quantity of a gaseous reducing and chlorinating agent such as, for example, $CCl_4$ or other totally or partially chlorinated hydrocarbon. Other reducing agents, gaseous under the purification conditions and capable of reducing the oxide of chromium in the presence of chlorine without reducing either chromous or chromic chloride, as carbon monoxide or sulfur chloride, can also be utilized. The amount of such reducing material will, in general, be less than 1% by volume since it is required only for the purpose of eliminating small quantities of oxide material. Such oxide materials are necessarily formed in small quantities from violet crystals of $CrCl_3$ containing $CrCl_2$ as impurity because the latter cannot be dehydrated even in substantially pure hydrogen chloride without hydrolysis and the resulting chromium oxide requires carbonaceous reducing materials for reconversion to chloride form.

Special equipment to carry on the above process steps is not necessary, because the only technical problem involved is that of corrosion, and those skilled in the art will be able to supply suitable mechanical means without difficulty. It may be noted, however, that for material of highest possible purity I have used equipment constructed of vitreous silica, or high silica brick. It is also possible to use porcelain, mullite, or sillimanite. Graphite does not act as a reducing agent in the environment and may be utilized except when relatively large quantities of ferric chloride are present as impurities, in which instance some disintegration of the graphite will occur. It is also possible to utilize nickel or chrome nickel steels if the temperature is not above 350° C.

The production of metallic chromium

The production of metallic chromium, as a metal or in sponge form, has been dealt with at length in my prior patent previously mentioned herein. Briefly, the process there disclosed included heating $CrCl_3$ to about 800° C. and passing it counter-current to a stream of pure dry hydrogen. The hydrogen, as introduced, was free of HCl, while when removed it contained a certain amount of this gas. The normal content of hydrogen chloride in the hydrogen from the reduction furnace, according to the process of that patent, is near 4.7% when the reduction is carried on at 800° C. This figure is determined by the 3.12% of hydrogen chloride at equilibrium for the $CrCl_2$ reduction, multiplied by the factor 1.5 to account for the stoichiometric ratio $CrCl_3:CrCl_2$, since the trivalent chloride is substantially irreversably reduced to chromous chloride by hydrogen. The hydrochloric acid equilibria for various temperatures in the reduction reaction of hydrogen with chromic chloride are given in my Patent 2,142,694. At one atmosphere these are 3.12% at 800° C. and 3.60% at 815° C. These values will change with the pressure.

In practicing the process of the present invention to produce chrome metal, either as such or in the form of sponge chromium directly from untreated $CrCl_3$ contaminated with any one or more of the metal chlorides, the $CrCl_3$ being hygroscopic and in the form of violet crystals, I can conveniently make use of the fact that the furnace operation in the reduction process described in my aforementioned patent produces substantially anhydrous hydrochloric acid. As is indicated above and in the aforementioned patent, the normal hydrogen chloride content of the exit gas stream from the reduction is, under ideal operating conditions and at one atmospheric pressure substantially 4.7%. This content of hydrogen chloride is not sufficient to carry on the desired purification and transformation of the violet $CrCl_3$ to the rose or puce colored crystal form. In accordance with the process of this invention, to secure a higher hydrogen chloride content, I provide the furnace reduction unit indicated at 11 in the single diagrammatic figure in the drawing with an auxiliary gas outlet at a point 25 which I shall describe as the $CrCl_2$ point.

It will be recalled that, in the apparatus more or less diagrammatically shown in the aforementioned patent, and which, for convenience, is partially reproduced here, I have represented a suitable furnace structure 11 into which a stream of violet chromic chloride is fed through a suitable hydrogen fed gas lock 26, and metallic chromium is removed through a gas lock 27, the locks being fed with hydrogen through lines 28 and 29. In the furnace, the chromic chloride is moved counter current to a stream of hydrogen from a line 35. Hydrogen is removed from the furnace to a suitable hydrogen recovery system generally indicated at 40 through line 36 with about a 4.7% hydrogen chloride content.

In the furnace wherein hydrogen chloride and hydrogen pass counter-currently over $CrCl_3$, there is a stage where virtually all of the $CrCl_3$ has been reduced to $CrCl_2$, but where normally little, if any, metallic chromium has been produced. The gas composition at this point in normal operation is at, or just below, 3.12% hydrogen chloride and the remainder is hydrogen. It is in the region in the furnace whereat this condition exists that I provide the auxiliary gas outlet.

From the auxiliary gas outlet at the $CrCl_2$ point I withdraw an adjusted portion, but not all of the gas stream through line 25 under control of a valve 37, this withdrawn stream being led to the hydrogen purification system generally indicated at 40. The residual part of the gas stream pursues its course through the furnace, and counter current to the chromium chloride feed stream. After issuing from the furnace through line 41 and being cooled to condense moisture and sublimed metallic chlorides in cooler 42, the hydrogen stream, containing at least 25% hydrogen chloride, is passed through a bag filter 43 of asbestos fabric and thence to suitable recovery means or disposal means for the hydrogen chloride. This can conveniently be the discharge line 51 of the active carbon purification cycle used by the main stream as disclosed in my aforementioned patent, where it will be combined with a gas mixture of approximately similar composition.

As increasing quantities of gas are withdrawn through line 25 in the region whereat chromium is present substantially only as $CrCl_2$, the hydrogen chloride content of the residual stream drawn at the chromic chloride feed end increases and can reach a maximum of 100% in some instances. For the purpose of converting $CrCl_3$ to the desired form, the maximum content of hydrogen chloride is desired, and this depends upon the material of construction of the reduction furnace.

When the reduction furnace is made of mild steel, as is disclosed in the aforementioned patent, the hydrogen chloride can be 25% to 45%, but this can be increased to 55%–75% when nickel is used. Best of all metallic materials that are commercially usable is nickel, with a thin lining of sheet silver. Such a furnace construction permits the hydrogen chloride content to be built up to above 95%. Refractory linings permit a close approximation to 100%, but involve mechanical difficulties of construction and maintenance.

Thus, in practicing my invention to produce chromium, I treat the chromium trichloride, in the form of violet crystals, directly with an enriched hydrogen chloride gas during the reduction process in that portion of the furnace between the chromium chloride feed and the region whereat the chromium chloride has substantially entirely reduced to only the divalent state. The hydrogen chloride content of the hydrogen in this portion of the furnace should be built up sufficiently to effect the desired purification directly in the reduction process by control of the relative amount of gas withdrawn at this point. I have found that a hydrogen chloride content of about 45% is satisfactory. While lesser amounts can be employed, the chromium trichloride fed to the furnace must be passed through the furnace more slowly under these circumstances, and this corresponds to the necessity for lengthening the furnace. Enhanced hydrogen chloride content, above 45%, permits rapid and more effective action.

Operation of the process of the present invention to produce chromium possesses a further advantage in that the load on the main purification system is lightened because the hygroscopic moisture in the material originally is driven off without converting the chromic chloride to oxidized form, and by-passed from the main purification cycle. Further, just as the hydrogen chloride treatment was found to disengage the impurities from their association with the $CrCl_3$ and permit that portion not sublimed to be readily leached from the product, so in this instance also it was found that virtually all the impurities are set free and sublimed without reduction. Thus, substantially all of the chlorides of iron, magnesium and manganese existing as impurities in the $CrCl_3$ are sublimed and caught in the exit bag house. A large portion of the aluminum chloride is also sublimed, but a very small residue of $Al_2O_3$ may be left in the sponge chromium since it is not possible to dry moist $Al_2Cl_6$ containing materials without hydrolysis, even in pure hydrogen chloride. Nickel chlorides are not removed, but the presence of minute quantities of nickel as a metal in the sponge chromium product is not disadvantageous.

Thus, in practicing the reduction of chromium chloride to chrome metal or sponge chromium, I can employ a less carefully purified $CrCl_3$ as the raw material, and end with a product of higher purity than by the simple drying process of my disclosure in my aforementioned patent, and at the same time divert a part comprising substantially one-third of the hydrogen chloride in the purification cycle, thus enabling a portion of the reduction plant to be decreased in size.

I claim:

1. A method of treating violet chromic chloride contaminated with only a small amount of at least one other metal chloride to free said chromic chloride of the contaminant and to render said chromic chloride non-hygroscopic and water insoluble, the method comprising heating said chromic chloride to a temperature between approximately 300° C. and 700° C. in an atmosphere composed substantially entirely of anhydrous hydrogen chloride until said chromic chloride is converted substantially entirely into non-hygroscopic water insoluble, puce colored chromic chloride and thereafter separating said other metal chloride from the non-hygroscopic water insoluble chromic chloride.

2. A method of treating violet chromic chloride contaminated with only a small amount of at least one other metal chloride to free said chromic chloride of the contaminant and render said chromic chloride non-hygrosopic and water insoluble, the method comprising heating said chromic chloride to a temperature between approximately 300° C. and 700° C. in a gas stream composed substantially entirely of anhydrous hydrogen chloride until said chromic chloride is converted substantially entirely into non-hygroscopic water insoluble, puce colored chromic chloride, removing in said gas stream any chloride volatilized during the heating, and thereafter cooling the chromic chloride and leaching any remaining other metal chloride from the non-hygroscopic water insoluble chromic chloride.

3. The method of claim 1 wherein the atmosphere contains chlorine in an amount less than about 10%.

4. The method of claim 2 wherein the gas stream contains chlorine in an amount less than about 10%.

5. The method of claim 1 wherein the atmosphere contains chlorine in an amount less than about 10% and about 1% of a material selected from the group consisting of a chlorinated hydrocarbon, carbon monoxide and sulfur chloride.

6. The method of claim 2 wherein the gas stream contains chlorine in an amount less than about 10% and about 1% of a material selected from the group consisting of a chlorinated hydrocarbon, carbon monoxide and sulfur chloride.

7. A method of rendering violet chromic chloride water insoluble and non-hygroscopic comprising heating said chloride to a temperature between approximately 300° C. and 700° C. and below that at which appreciable volatilization of the chloride occurs in an atmosphere of anhydrous hydrogen chloride until said chromic chloride is converted substantially entirely into non-hygroscopic water insoluble, puce colored chromic chloride.

CHARLES G. MAIER.